United States Patent
Stackpole (10) Patent No.: US 7,967,356 B2
(45) Date of Patent: Jun. 28, 2011

(54) VEHICULAR CARGO SPACE EXTENDER

(76) Inventor: Donald Stackpole, Oviedo, FL (US)

( * ) Notice: Subject to any disclaimer, the term of this patent is extended or adjusted under 35 U.S.C. 154(b) by 0 days.

(21) Appl. No.: 12/396,113

(22) Filed: Mar. 2, 2009

(65) Prior Publication Data

US 2009/0309380 A1  Dec. 17, 2009

Related U.S. Application Data (60) Provisional application No. 61/032,500, filed on Feb. 29, 2008.

(51) Int. Cl.
*B62D 33/08* (2006.01)
(52) U.S. Cl. ............ 296/26.09; 296/26.08; 224/402
(58) Field of Classification Search .......... 296/26.01, 296/26.08, 26.09; 224/402–404
See application file for complete search history.

(56) References Cited

U.S. PATENT DOCUMENTS

| | | | | |
|---|---|---|---|---|
| 2,284,419 A * | 5/1942 | Greig | ........................ | 296/26.09 |
| 2,852,303 A * | 9/1958 | Hopson | ..................... | 296/26.09 |
| 4,909,558 A * | 3/1990 | Roshinsky | ................... | 296/37.6 |
| 5,456,511 A * | 10/1995 | Webber | ....................... | 296/26.09 |
| 5,564,767 A * | 10/1996 | Strepek | ..................... | 296/26.09 |
| 5,649,731 A * | 7/1997 | Tognetti | ..................... | 296/26.09 |
| 5,669,654 A * | 9/1997 | Eilers et al. | ................ | 296/26.11 |
| 5,816,637 A * | 10/1998 | Adams et al. | ............. | 296/26.09 |
| 6,921,120 B1 * | 7/2005 | Ervin | ......................... | 296/26.02 |
| 7,090,275 B2 * | 8/2006 | Pero | ............................. | 296/37.6 |
| 7,243,966 B1 * | 7/2007 | Sheldon | .................... | 296/26.08 |
| 7,377,569 B2 * | 5/2008 | Taylor et al. | ................ | 296/37.6 |
| 7,445,263 B1 * | 11/2008 | Bluhm | ....................... | 296/26.09 |
| 7,543,873 B1 * | 6/2009 | Thornsberry | ............. | 296/26.09 |
| 2002/0140245 A1 * | 10/2002 | Coleman et al. | .......... | 296/26.09 |
| 2003/0141733 A1 * | 7/2003 | Burg | .......................... | 296/26.09 |
| 2007/0090661 A1 * | 4/2007 | Shagbazyan | .............. | 296/26.09 |
| 2009/0284036 A1 * | 11/2009 | Clayton | .................... | 296/26.09 |

* cited by examiner

*Primary Examiner* — Lori L Lyjak
(74) *Attorney, Agent, or Firm* — Allen Dyer Doppelt Milbrath & Gilchrist (57) ABSTRACT

A vehicular cargo space extender includes a frame assembly adapted for slidable mounting to the vehicular cargo space. The frame assembly is slidable between an extended position and a retracted position. In the extended position, the frame assembly extends effectively increases the length of the vehicular cargo space. In the retracted position, the frame assembly fits within the vehicular cargo space without obstructing the unextended length thereof.

2 Claims, 10 Drawing Sheets

FIG. 13

VEHICULAR CARGO SPACE EXTENDER

CROSS-REFERENCE TO RELATED APPLICATION

This application claims the benefit of U.S. Provisional Application No. 61/032,500, filed on Feb. 29, 2008, the contents of which are hereby incorporated by reference in their entirety.

FIELD OF THE INVENTION

The present invention relates to increasing the available cargo space of vehicles, and more particularly, to increasing available cargo space for pickup truck beds.

BACKGROUND OF THE INVENTION

When selecting a work vehicle, there are typically many trade-offs to be considered. For instance, a full-size pickup truck has a larger bed than a mid-sized or compact pickup truck. On the other hand, a full-size pickup truck typically has, sometimes significantly, lower gas mileage than a smaller truck and is usually much easier to maneuver in traffic and park in close quarters.

Since the full capacity of a truck bed is not always required, smaller trucks are frequently selected. When a larger load must be carried, one must go to the inconvenience of borrowing a larger truck or take the risk of overloading the current truck. The sight of compact or mid-sized pickup trucks with sheets of plywood, lumber or other loads perilously extending beyond the confines of the bed is all too common on the highways.

Figure 1:
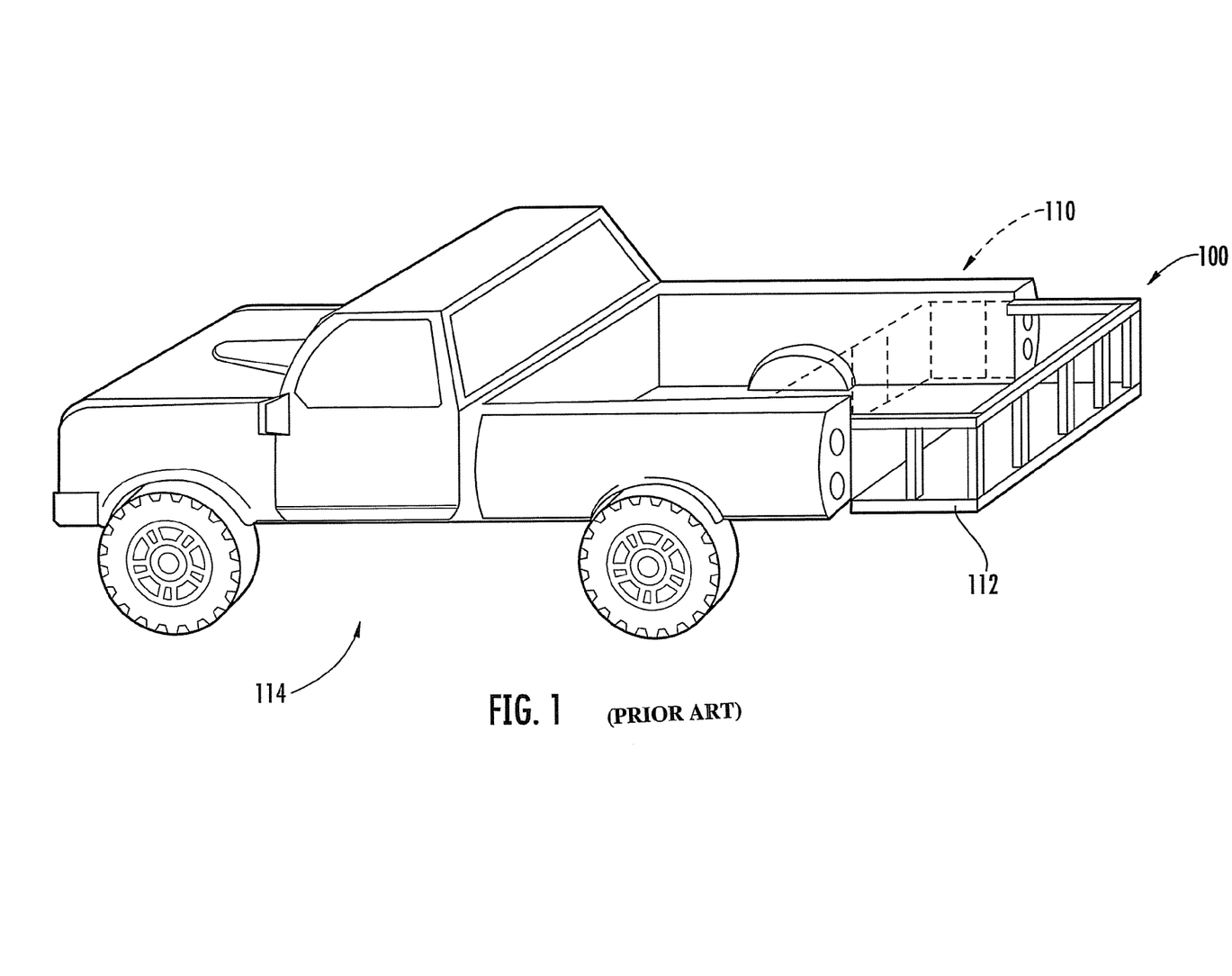
FIG. 1 is a perspective view including a rotatable frame.

Referring to FIG. 1, one attempt to address this problem involves the use of a frame 110 rotatably mounted adjacent to the tailgate 112 of a pickup truck 114. When a slightly larger bed length is desired, the tailgate 112 is lowered and the frame 110 is rotated onto the lowered tailgate 112 to act as a barrier to items in the bed. However, the bed extensibility of this approach is essentially limited to the height of the tailgate 112. Additionally, when the tailgate 112 is closed, the frame 110 obstructs the pickup truck bed (see frame 110 in broken lines).

SUMMARY OF THE INVENTION

In view of the foregoing, it is an object of the present invention to provide a truck bed extender allowing the effective length of a truck bed or other vehicular cargo space to be extended beyond the height of the tailgate. It is a further object of the present invention to provide a truck bed extender that does not obstruct the truck bed or other cargo space when not in an extended position.

According to an embodiment of the present invention, a vehicular cargo space extender includes a frame assembly adapted for slidable mounting to the vehicular cargo space. The frame assembly is slidable between an extended position and a retracted position. In the extended position, the frame assembly extends effectively increases the length of the vehicular cargo space. In the retracted position, the frame assembly fits within the vehicular cargo space without obstructing the unextended length thereof.

According to an aspect of the present invention, the frame assembly includes a base and a pair of opposed sidewalls extending upward therefrom. In the extended position, at least portions of the base and sidewalls extend beyond the unextended length of the vehicular cargo space and partially bound the extended length thereof. The frame assembly further includes a gate rotatably connected with the base and rotatable between a closed position, perpendicular with the base and abutting ends of the sidewalls, and a lowered position, substantially coplanar with the base.

These and other objects, aspects and advantages of the present invention will be better understood in view of the drawings and the following detailed description of preferred embodiments.

DETAILED DESCRIPTION OF PREFERRED EMBODIMENTS

Figure 2:
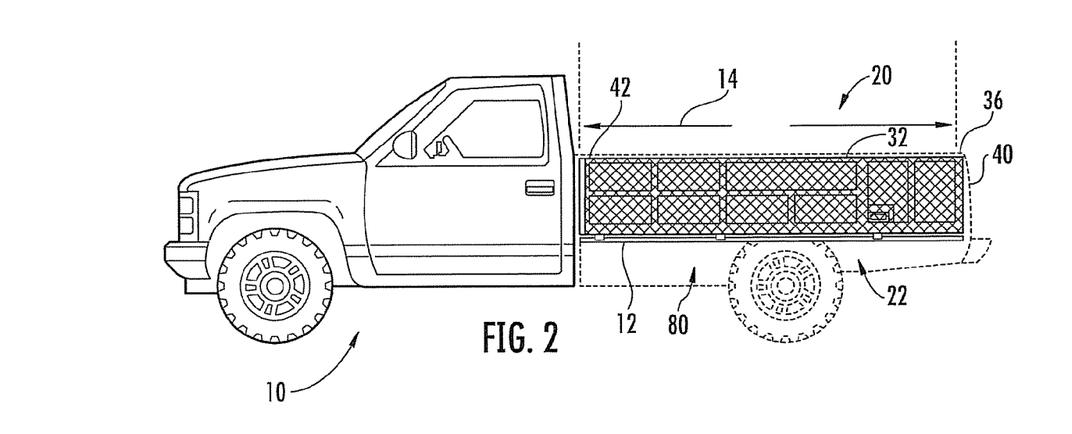
FIG. 2 is a side view of a vehicle including vehicular cargo space assembly having a frame assembly and slide assembly with the frame assembly in a retracted position, according to an embodiment of the present invention.
Figure 3:
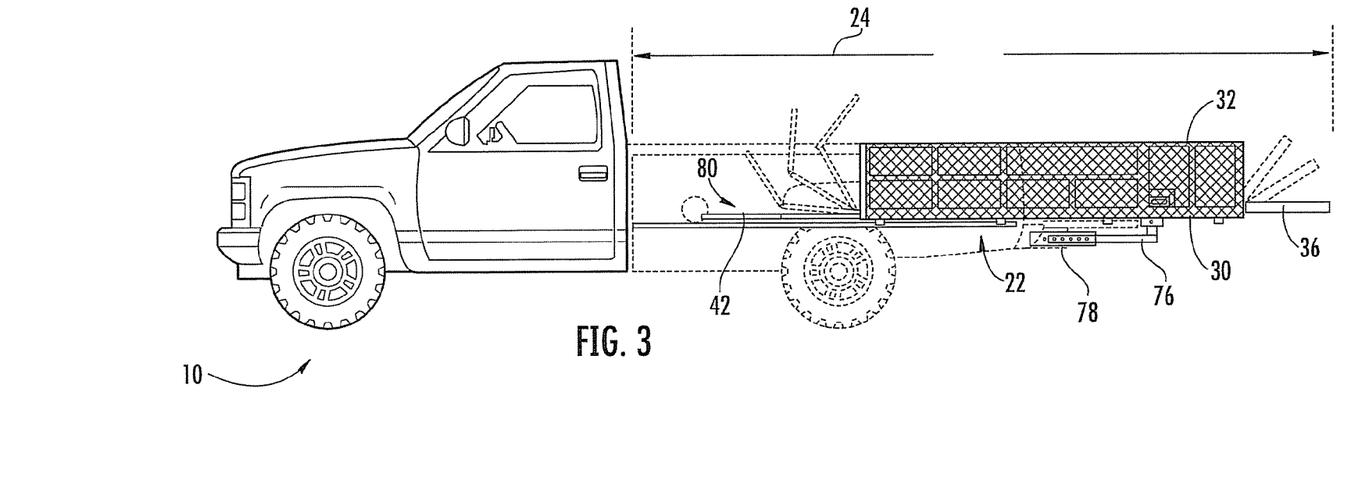
FIG. 3 is a side view of the vehicle of FIG. 2, with the frame assembly in an extended position.

Referring to FIGS. 2 and 3, a vehicle 10, such as a pickup truck, includes a cargo space 12, for example, a truck bed. The cargo space 12 has an unextended length 14. A vehicular cargo space extender 20 is arranged in the cargo space 12. The extender 20 includes a frame assembly 22 slidably mounted to the cargo space 12. The frame assembly 22 is slidably displaceable between a retracted position (as shown in FIG. 2) and an extended position (as shown in FIG. 3).

In the retracted position, it will be appreciated that the frame assembly 22 does not substantially obstruct the unextended length 14 of the cargo space 14. In the extended position, the frame assembly effectively increases the cargo space 14 to an extended length 24.

Figure 4:
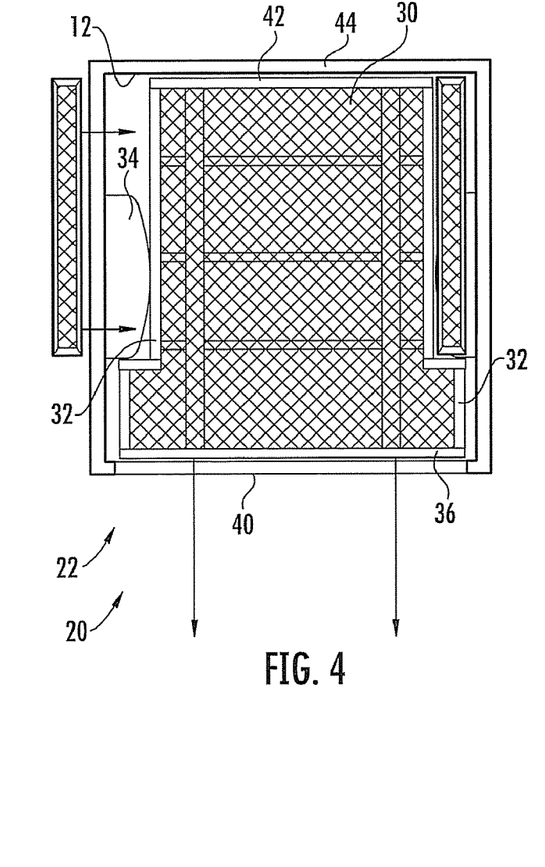
FIG. 4 is a top view of a cargo area of the vehicle of FIG. 2, with the frame assembly in the retracted position.
Figure 5:
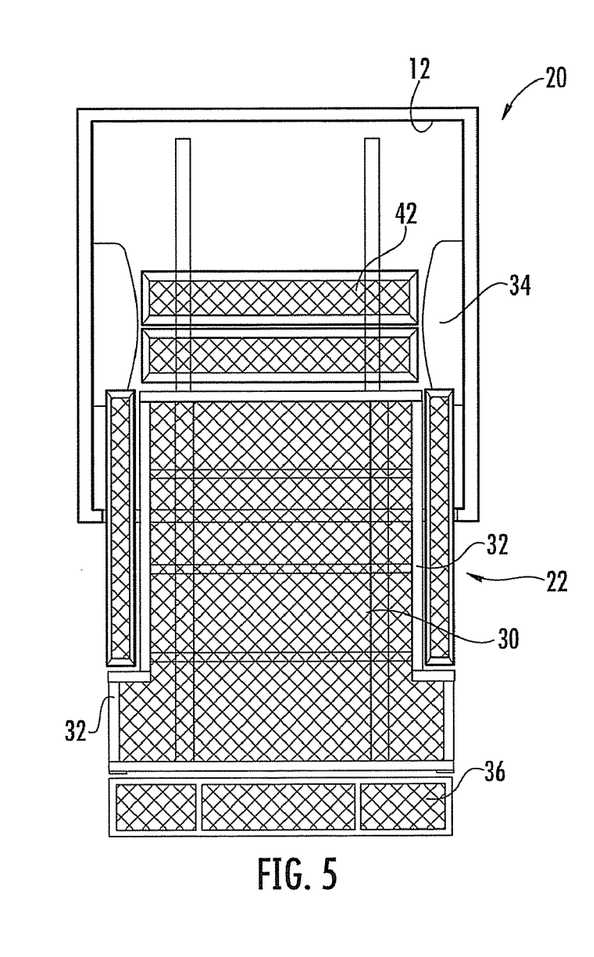
FIG. 5 is a top view of the cargo area of the vehicle of FIG. 2, with the frame assembly in the extended position.

Referring to FIGS. 4 and 5, the frame assembly 22 includes a base 30 with sidewalls 32 extending upwardly therefrom (see also FIGS. 1 and 2). Advantageously, the sidewalls 32 are shaped to accommodate wheel wells 34 protruding into the cargo area 12.

In addition to the sidewalls 32, the frame assembly 22 includes a frame assembly tailgate 36 rotatably connected to the base 30. The base 30 is rotatable between as closed position (as shown in FIGS. 2 and 4) where the tailgate 36 abuts ends of respective sidewalls 32 and a lowered position (as shown in FIGS. 3 and 5) where the tailgate 36 extends substantially coplanar with the base 30.

It will be appreciated from FIGS. 2 and 4 that when the frame assembly 22 is in the retracted position, the frame assembly tailgate 36 is accommodated adjacent to the vehicle tailgate 40, such that the tailgate 36 does not substantially obstruct the unextended length 14 of the cargo area 12. If will appreciated from FIGS. 3 and 5 that when the frame assembly 22 is in the extended position, portions of the base 30 and sidewalls 32 (as well as the frame assembly tailgate 36, if in the closed position) partially bound the extended length 24 of the cargo area 12.

Referring to FIGS. 3-5, the frame assembly 22 also includes a forward gate 42 that is unfoldable with the frame assembly 22 is the extended position. FIG. 3 shows the forward gate 42 fully folded down in solid lines and in various stages of folding in broken lines. With the forward gate 42 folded up (as shown in FIGS. 2 and 4), the forward gate 42 accommodated adjacent to a front wall 44 of the cargo area 12, such that the forward gate 42 does not substantially obstruct the unextended length 14 of the cargo area 12.

Figure 6:
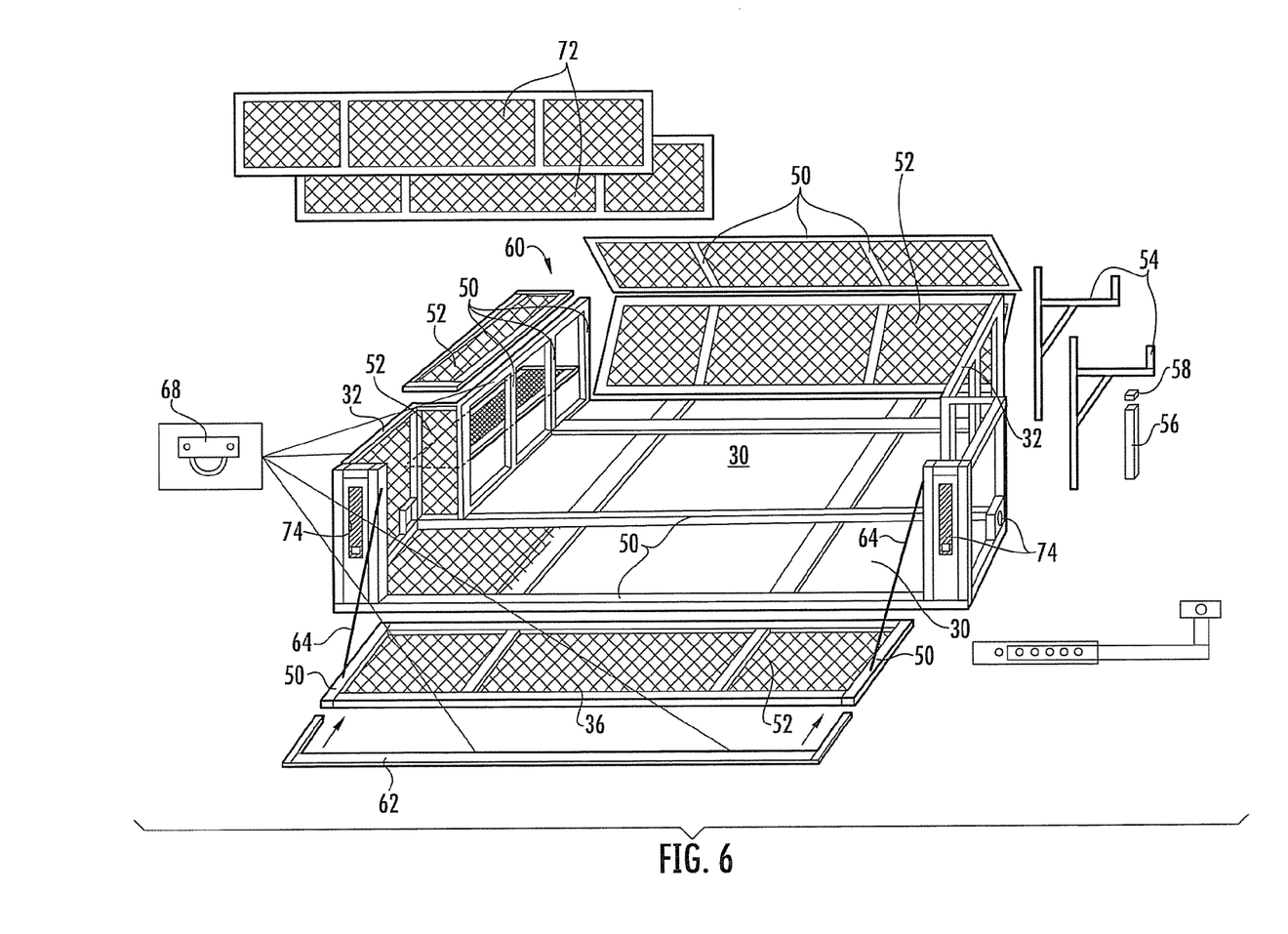
FIGS. 6 and 7 are perspective views of the frame assembly of FIG. 1, with components partially exploded, and components removed, to show details.
Figure 7:
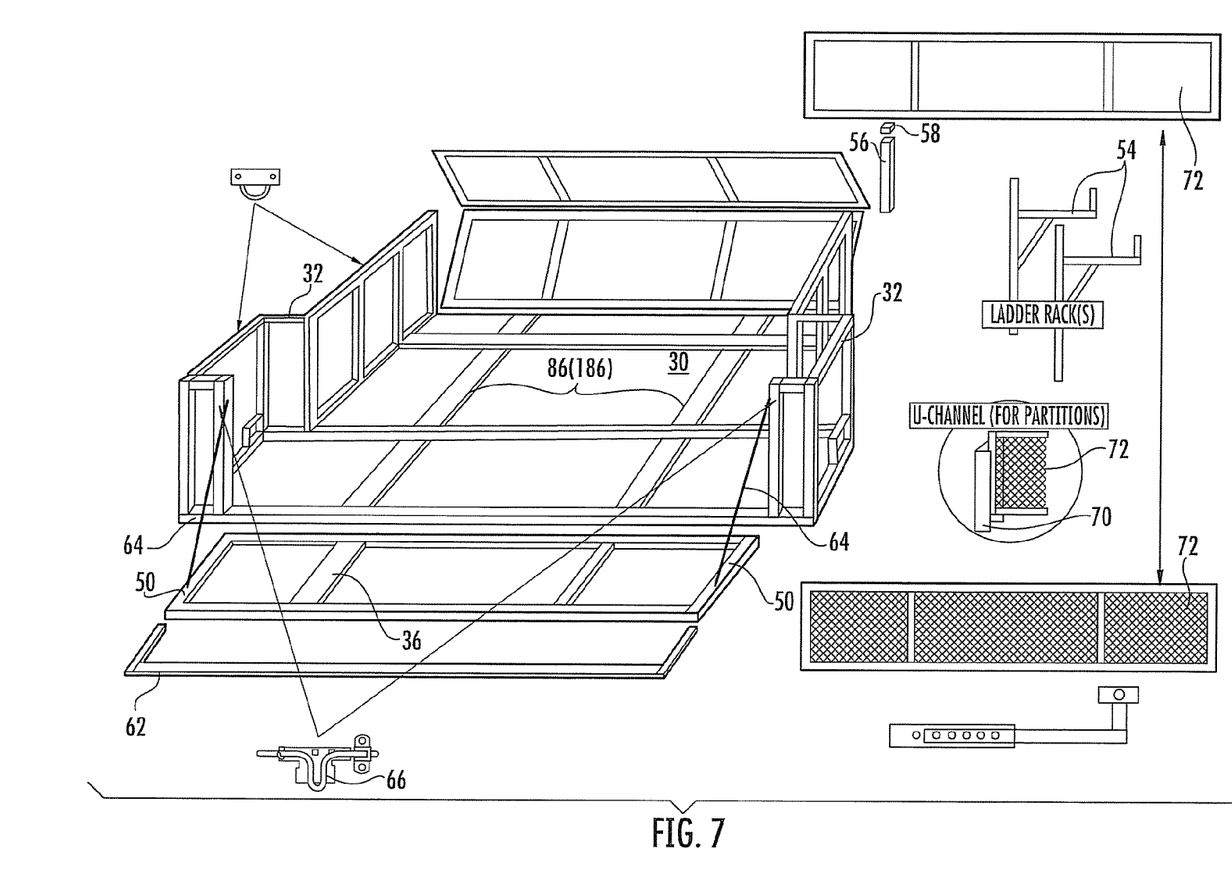

Referring to FIGS. 6 and 7, the base 30, sidewalls 32, tailgate 36 and forward gate 42 of the frame assembly 22 are formed from a plurality of ribs 50. Perforated sheeting 52 covers open areas between the ribs 50. The ribs 50 preferably have a tubular or box structure with a hollow interior. Joints between ribs 50 and connections between ribs 50 and sheeting 52 are preferably welded.

Ladder racks 54 are removably accommodatable by the frame assembly 22. To accommodate the ladder racks 54, ladder rack holders 56 are secured to a plurality of points on ribs 50 of the frame assembly 22. Caps 58 are inserted into the upper ends of the ladder rack holders 56 to inhibit the introduction of water or debris when not in use. Alternately, or in addition to, ladder rack holders 56, vertically oriented ribs 50 can have an open upper end into which the ladder racks 54 are inserted. Caps to seal these open upper ends when not in use can also be provided.

Advantageously, storage boxes 60 frame in the areas where the sidewalls 32 accommodate the wheel wells 34 of the vehicle 10 and enclosed with sheeting 52. A telescoping tailgate extension 62 is inserted in open ends of the ribs 50 of the tailgate 32 to allow the tailgate to be selectively extended. Tailgate tethers 64 hold the tailgate 32 in the lowered position and tailgate locks 66 secure the tailgate in the closed position.

A plurality of strap tie downs 68 are secured to the frame assembly 22, permitting hold down straps to be connected to the frame assembly to better secure cargo in the cargo area 12. Additionally, approximately unshaped channels 70 are connected to opposed vertical ribs 50 of the sidewalls 32, allowing removable insertion of partition panels 72 therebetween.

Although the frame assembly 22 does not substantially obstruct the unextended length 14 of the cargo area 12, it may sometimes be desired to partition the cargo area 12. For example, partitioning may be desirable to keep various cargo items from shifting during travel. Inserting one or more partition panels 72 enables partitioning of the cargo area 12 into two or more separate zones.

Additionally, a plurality of lights 74 are arranged on the frame assembly 22 and electrically connected to the vehicle 10. As will be appreciated from FIG. 2, when the frame assembly 22 is in the extended position, the frame assembly 22 extends substantially beyond the rear end of the vehicle 10. Lights 74 on the frame assembly 22 are able to perform functions of tail lights, brake lights, turning signals and the like, enhancing light visibility with the frame assembly 22 in the extended position.

Referring again to FIG. 3, to increase stability, and allow greater loading, of the frame assembly 22 in the extended position, a support bracket 76 is removably connectable to an attachment point 78, such as a trailer hitch receiver, on the vehicle 10. When connected, the support bracket 76 extends rearwards between the attachment point 78 and the base 30, supporting the base 30 closer to the frame assembly tailgate 36.

Figure 8:
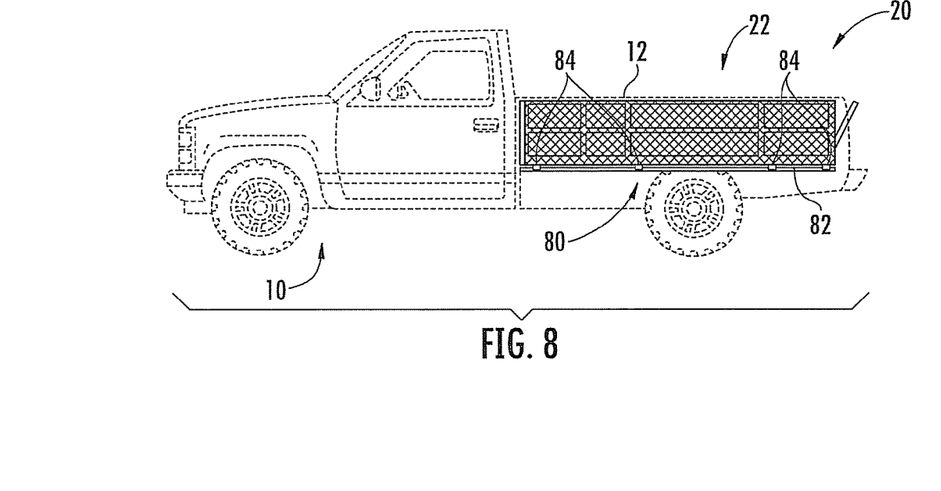
FIG. 8 is a side view of the vehicle of FIG. 2, showing details of the slide assembly.

Referring to FIG. 8, the vehicular cargo space extender 20 further includes a slide assembly 80. The slide assembly includes a plurality of rails 82 attached to the vehicle 10 in the cargo area 12 and slides 84 attached to the frame assembly 22. The slides 84 are slidably displaceable along the rails 82 in the length direction of the cargo area, allowing the frame assembly 22 to slide between the retracted and extended position. A low friction surface 86 is located at the interface between the rails 82 and slides 84, such as polytetrafluoroethylene, other fluoropolymers, or the like. Preferably, one or more stops are positioned to limit the range of motion of the frame assembly 22 and allow the frame assembly to be releasably secured in one or more particular positions, such as in the fully extended position.

Figure 9:
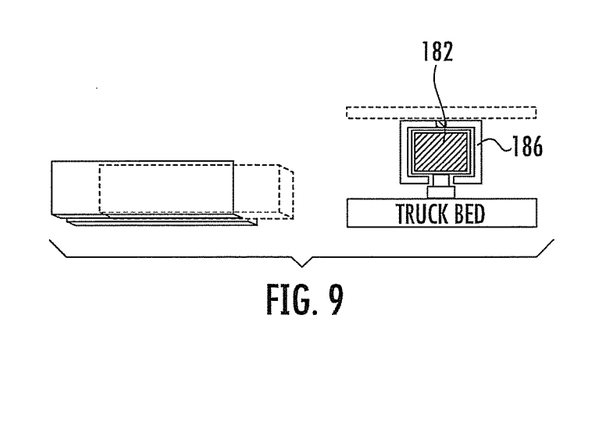
FIG. 9 is a cross-sectional view and a partial perspective view of a slide assembly according to another embodiment of the present invention.
Figure 10:
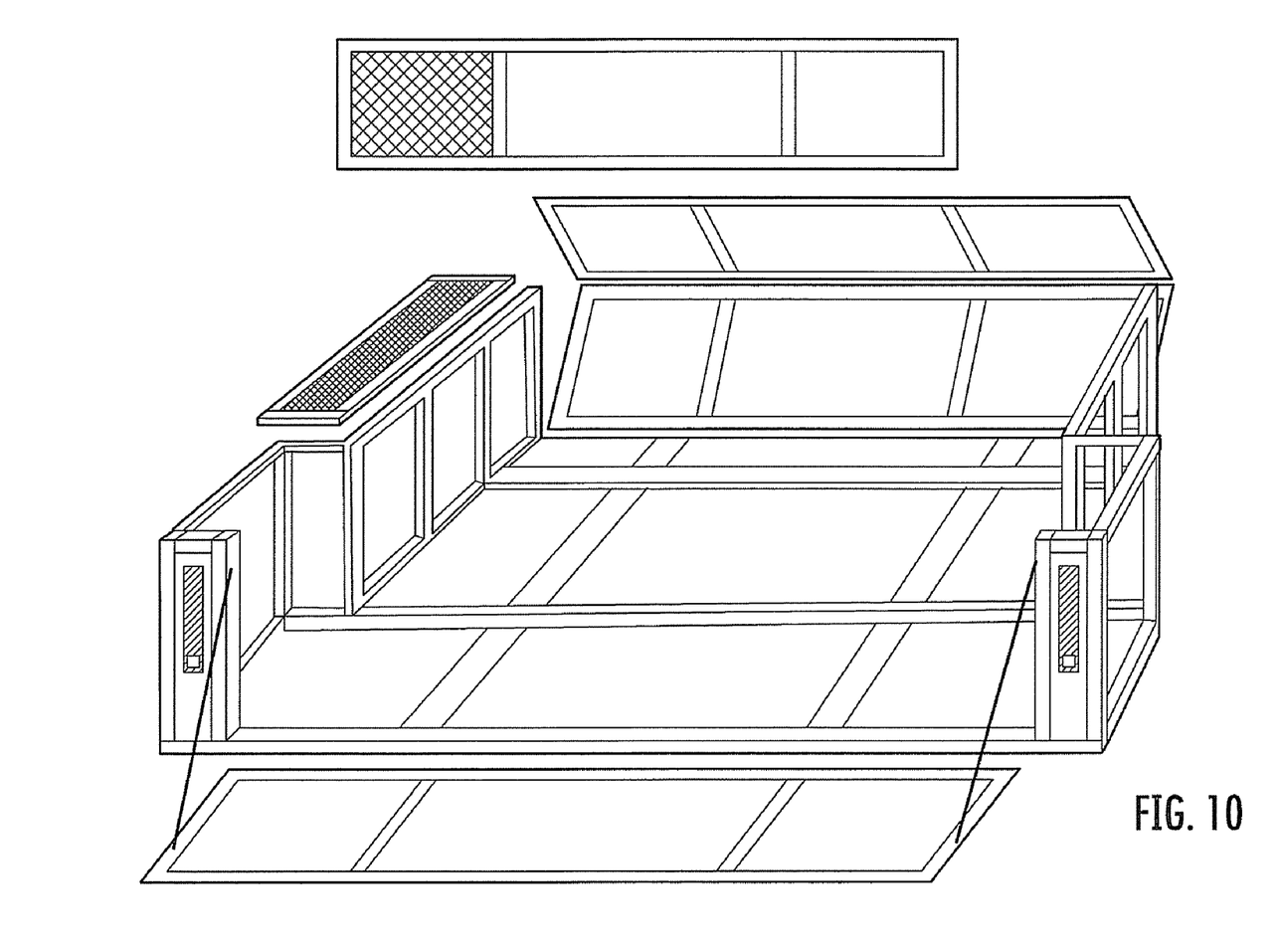
FIGS. 10-13 are additional views of components of the vehicular cargo space assembly of FIG. 2.
Figure 11:
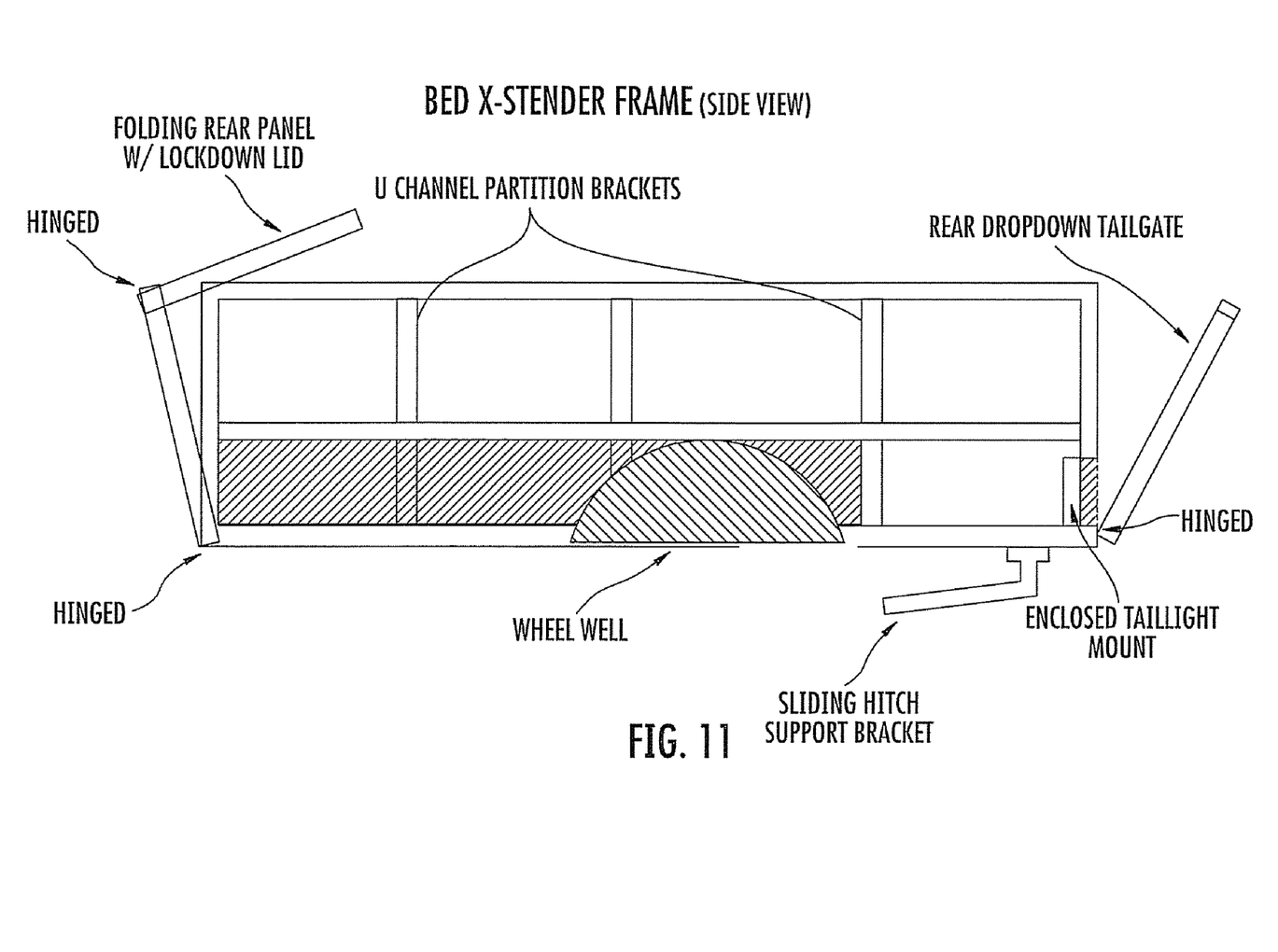
Figure 12:
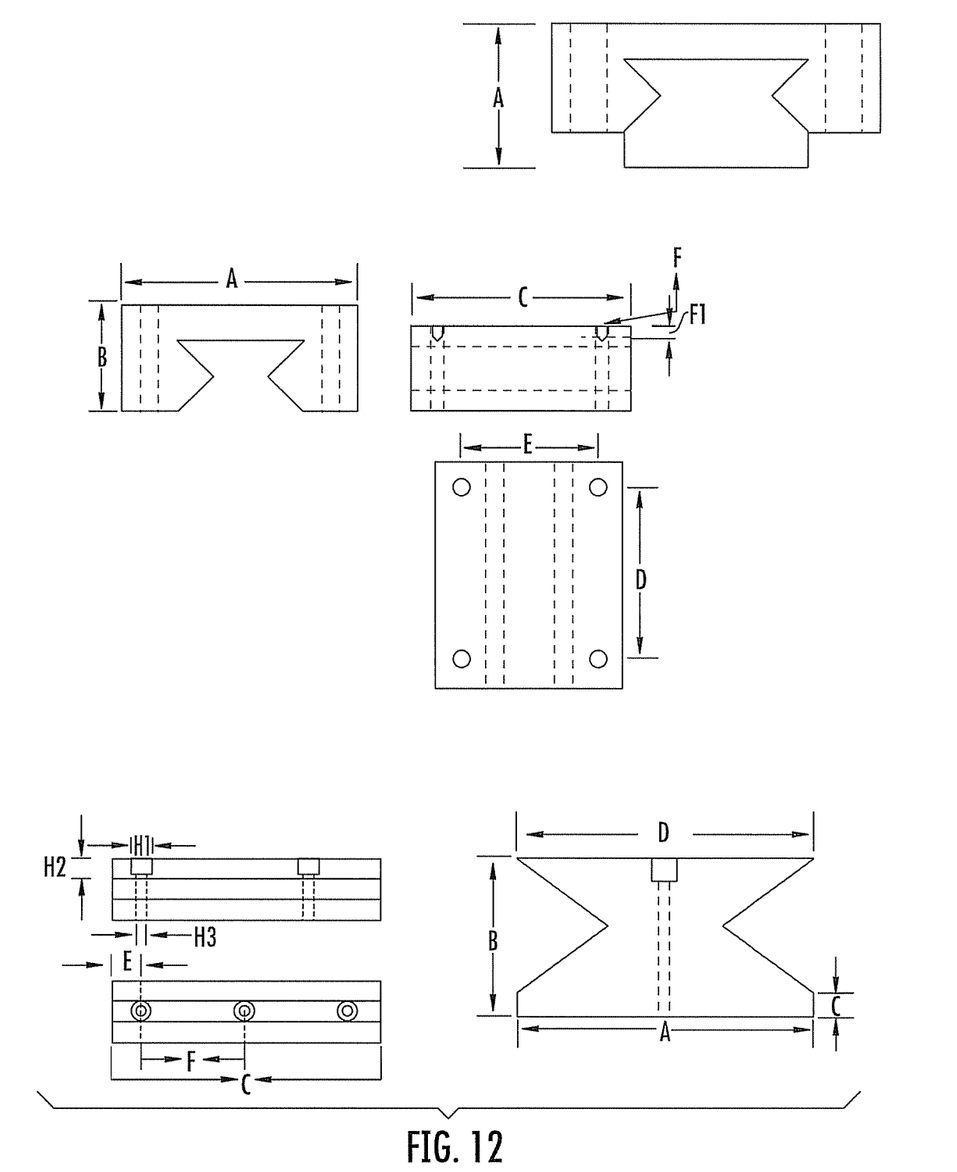
Figure 13:
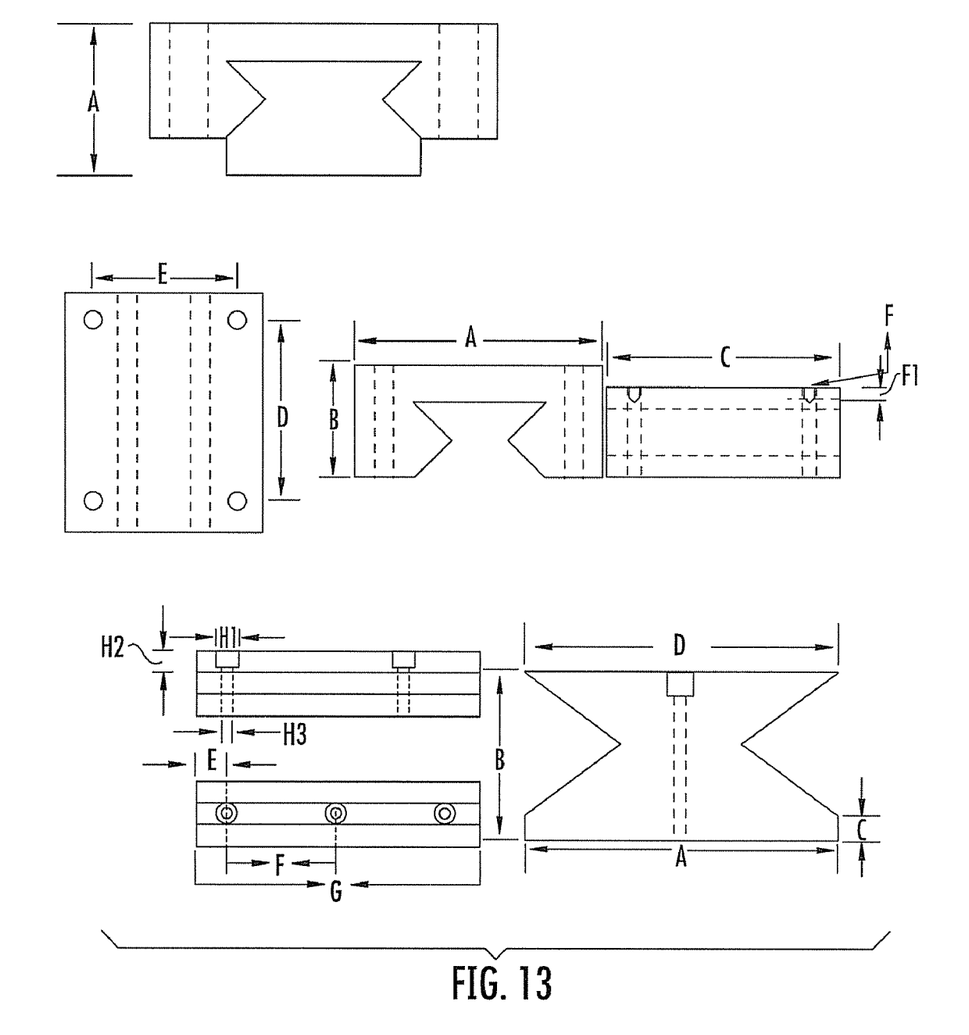

Referring again to FIG. 7, the slides 84 are connected to bracing 86. The bracing 86 is connected to a plurality of the ribs 50 forming the base 30 of the frame assembly. Alternately, bracing 186 having a hollow box shape, as shown in FIG. 9, is connected to the frame assembly with complementary rails, or discrete rail portions, 182 slidable within the bracing 186.

FIGS. 10-13 include other views of the vehicular cargo space extender 20 are components thereof.

In operation of the vehicular cargo space extender 20, the tailgate 40 of the vehicle 10 is lowered and the frame assembly 22 is slid rearwards along the slide assembly 80. Once the frame assembly 22 is fully extended, the frame assembly 22 is locked in place. The support bracket 76 is connected to the attachment point 78 and engages the underside of the base 30. Alternately, the support bracket 76 can be connected to the attachment point 78 before sliding the frame assembly 22 rearwards.

The forward gate 42 is unfolded into a position substantially coplanar with the bed 30. Alternately, the forward gate 42 can be left up and serve as a partition. If additional length is desired, the frame assembly tailgate 36 is placed in the lowered position and the telescoping tailgate extension 62 can be extended and locked.

An electrical connection is established between the lights 74 and the vehicle 10. Preferably, this connection is established automatically when the frame assembly 22 is moved into the extended position. If partitioning of the cargo space is desired, one or more partitions 72 are inserted in the channels 70.

When additional cargo area is no longer required, the forward gate 42 is folded up. The slide assembly 80 is unlocked and the frame assembly 22 is slid forwards to the retracted position. The frame assembly tailgate 36 is raised and the extension 62 is retracted. The vehicle 10 tailgate 40 can then be raised. Partitions 72, if no longer desired or needed, are removed.

Those skilled in the art will appreciate that the present invention is not limited to the embodiments herein shown and described, and that numerous modifications, and adaptations to particular circumstances, are possible with the scope of the present invention.

For example, the present invention is not necessarily limited to use in connection with a particular type of vehicle 10 or cargo area 12. For instance, in addition to pickup trucks, the present invention could advantageously be employed in connection with station wagons, sport utility vehicles and box trucks, among other vehicles. Also, particular dimensions are listed in the drawings which have advantageously been found suitable for a vehicle and cargo area of the type shown.

However, other dimensions are possible within the scope of the present invention, as needed or desired for a given vehicle and cargo area.

Additionally, the present invention is not necessarily limited to particular materials or surface treatments. Powder coated aluminum has been found advantageous for strength and weight purposes, as well as having an appealing appearance. However, other metals, plastics, woods and additional materials are all possible within the scope of the present invention.

Also, a particular configuration of slidably displaceable frame assembly. For example, frame assemblies featuring integrally molded panels or uni-body construction could be used instead of, or in combination with, frame assemblies with discrete ribs. For frame assemblies with ribs or other discrete structural members, solid panels or other materials can be used in open areas in lieu of screening, or screening or panels can be omitted altogether or omitted in particular locations. Moreover, frame assemblies including sidewalls extending above corresponding cargo area sidewalls of the vehicle and frame assemblies without sidewalls, tailgates or other elements, as well as frame assemblies incorporating covers and other features can be employed with the scope of the present invention.

Furthermore, frame assemblies with different light 74 configurations or without lights can be used within the scope of the present invention. Additionally, more or different support brackets 76 can be employed, or the support bracket 76 can be omitted. Also, other slide assemblies, beyond those shown and described herein, as well as slide assemblies attached to vehicles at other points than cargo area beds, can be employed to slidably mount a frame assembly to a vehicle.

The foregoing is not an exhaustive list of modifications or adaptations falling within the scope of the present invention. Rather, those skilled in the art will appreciate that these and other modifications, adaptations and variations are all possible within the scope of the invention herein shown and described.

What is claimed is:

1. A vehicular cargo space extender assembly comprising:
  a frame assembly adapted for slidable mounting to a vehicular cargo space, the frame assembly being slidable between an extended position and a retracted position relative to the cargo space;
  wherein, in the extended position, the frame assembly extends effectively increases the length of the vehicular cargo space and, in the retracted position, the frame assembly fits within the vehicular cargo space without obstructing an unextended length thereof;
  wherein the frame assembly includes a base and a pair of opposed sidewalls extending upward therefrom and, in the extended position, at least portions of the base and sidewalls extend beyond the unextended length of the vehicular cargo space and partially bound the extended length thereof;
  wherein the frame assembly further includes a frame assembly tailgate rotatably connected with the base and rotatable between a closed position, perpendicular with the base and abutting rearward ends of the sidewalls, and a lowered position, substantially coplanar with the base; and
  wherein the frame assembly further includes a frame assembly forward gate rotatably connected with the base and rotatable between a closed position, perpendicular with the base and abutting forward ends of the sidewalls, and a lowered position, substantially coplanar with the base.

2. The frame assembly of claim 1, wherein the sidewalls of the frame assembly include inwardly extended portions shaped to accommodate wheel wells of the vehicular cargo space with the frame assembly in the retracted position.

* * * * *